United States Patent [19]

Arlt et al.

[11] 4,423,196  
[45] Dec. 27, 1983

[54] COPOLYMERS OF PROPYLENE AND ALLYL ALCOHOL

[75] Inventors: Klaus-Peter Arlt, Senden; Rudolf Binsack, Krefeld; Ulrich Grigo, Krefeld; Dieter Neuray, Krefeld, all of Fed. Rep. of Germany

[73] Assignee: Bayer Aktiengesellschaft, Leverkusen, Fed. Rep. of Germany

[21] Appl. No.: 321,277

[22] Filed: Nov. 13, 1981

Related U.S. Application Data

[63] Continuation of Ser. No. 122,575, Feb. 19, 1980, abandoned, which is a continuation-in-part of Ser. No. 110,790, Jan. 9, 1980, abandoned.

[30] Foreign Application Priority Data

Jan. 17, 1979 [DE] Fed. Rep. of Germany ....... 2901646

[51] Int. Cl.³ .................... C08F 216/08; C08F 220/62  
[52] U.S. Cl. ..................................... 526/72; 526/240; 526/313; 526/317  
[58] Field of Search .......................... 526/72, 313, 317

[56] References Cited

U.S. PATENT DOCUMENTS

| 2,801,981 | 8/1957 | Spacht | 526/313 |
| 3,267,085 | 8/1966 | Shouse | 526/72 |
| 3,477,991 | 11/1969 | Patton | 526/313 |
| 3,761,458 | 9/1973 | Holler | 526/310 |

FOREIGN PATENT DOCUMENTS

| 476857 | 9/1951 | Canada ................. 526/72 |
| 1917230 | 1/1970 | Fed. Rep. of Germany . |
| 1947109 | 3/1970 | Fed. Rep. of Germany . |
| 1947590 | 4/1970 | Fed. Rep. of Germany . |
| 911763 | 11/1962 | United Kingdom ........ 526/72 |
| 1265198 | 3/1972 | United Kingdom . |
| 1278516 | 6/1972 | United Kingdom . |

OTHER PUBLICATIONS

"High Polymers", vol. XXIX, Polymerization Processes, Edited by Calvin E. Schildknecht, pp. 337–418.  
"High Polymers", vol. XXVIII, Allyl Compounds and Their Polymers (Including Polyolefins), pp. 56–63, 122–123, 200–211.  
"High Polymers", vol. XI, Polyethylene, pp. 364–371.  
Journal of Polymer Science: Part A, vol. 2, pp. 4247–4253, "Free-Radical Polymerization of Olefins", 1964.

Primary Examiner—C. A. Henderson  
Attorney, Agent, or Firm—Connolly and Hutz

[57] ABSTRACT

Copolymers of (a) one or more α-olefins having the formula (A)

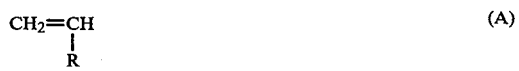

wherein R is a $C_1$–$C_{16}$ alkyl group or a phenyl group; and (b) one or more substituted α-olefins having the formula (B)

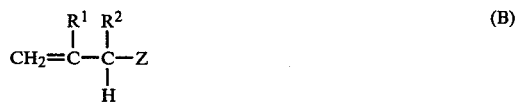

wherein $R^1$ is a hydrogen atom or a methyl group, $R^2$ is a hydrogen atom or a $C_1$–$C_4$ alkyl group, and Z is an —OH, —COOH,

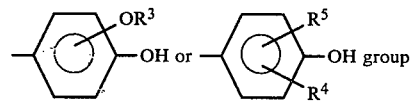

in which $R^3$ is a hydrogen atom or a $C_1$–$C_4$ alkyl group, and each of $R^4$ and $R^5$ is a $C_1$–$C_4$ alkyl group, said copolymers having from 1 to 50% by weight of the monomers of formula (B) incorporated therein in polymerized form and a melt flow index (MSI 230/5) of from 2 to 20 g/10 min. and a process for their manufacture.

1 Claim, No Drawings

COPOLYMERS OF PROPYLENE AND ALLYL ALCOHOL

CROSS REFERENCE TO RELATED APPLICATION

This application is a continuation of application Ser. No. 122,575 filed Feb. 19, 1980, now abandoned, which in turn is a continuation-in-part of application Ser. No. 110,790 filed Jan. 9, 1980, now abandoned.

SUMMARY OF THE INVENTION

The present invention provides copolymers of α-olefins corresponding to the formula (A)

  (A)

wherein R represents a $C_1$–$C_{16}$ alkyl or a phenyl group, and substituted α-olefins corresponding to the formula (B)

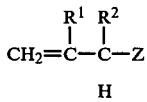  (B)

wherein $R^1$ is a hydrogen atom or a methyl group; $R^2$ is a hydrogen atom or a $C_1$–$C_4$ alkyl group; Z is an —OH, —COOH,

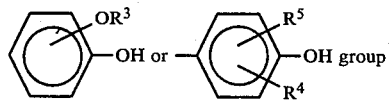

wherein $R^3$ is a hydrogen atom or a $C_1$–$C_4$ alkyl group and $R^4$ and $R^5$ are each of $C_1$–$C_4$ alkyl group, said copolymers having from 1 to 50% by weight of monomer (B) incorporated in polymerized form and which have a melt flow index (MSI 230/5) of from 2 to 20 g/10 minutes.

The present invention also provides a process for the production of copolymers of α-olefins corresponding to formula (A) with substituted α-olefins corresponding to formula (B) wherein one or more α-olefins (A) are reacted with a metal compound of the substituted α-olefin (B) corresponding to the formula (D)

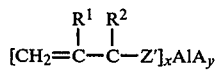  (D)

wherein $R^1$ and $R^2$, are as hereinbefore defined, Z' is a —O—; —COO—;

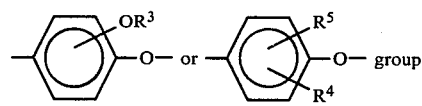

wherein $R^3$, $R^4$ and $R^5$ are as hereinbefore defined A is a halogen atom and/or a $C_1$–$C_{18}$ alkyl group, and x and y are integers which add up to 3, in the presence of a catalyst which is a solid catalytic complex based on TiCl$_3$ and an aluminium compound corresponding to the formula (C)

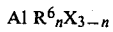  (C)

wherein $R^6$ is a $C_1$–$C_{18}$ alkyl group, X is a halogen atom, preferably a chlorine atom and $0 < n \leq 3$.

BACKGROUND OF THE INVENTION

The homopolymerisation of α-olefins and the copolymerisation of α-olefins with one another in the presence of Ziegler-Natta catalysts are known. Although the properties which are due to the olefinic character of these polymers, such as resistance to water and chemical resistance to acids and alkalis, are generally advantageous, the absence of polar groups gives rise to certain disadvantages, such as poor dyeability, weak adhesion, poor printability and poor miscibility with other polymers, particularly polymers containing polar groups. Pure polyolefins become electrostatically charged more easily and attract dust and dirt particles.

It is known that copolymers of olefins and unsaturated monomers containing polar groups can be produced by radical polymerisation but crystalline copolymers cannot be obtained by this process if olefins containing more than 2 carbon atoms are used. In addition, it is not possible to obtain a sufficiently high degree of polymerisation when radical copolymerisation is carried out with higher olefins.

The copolymerisation of α-olefins with α-olefins containing polar groups in the presence of Ziegler-Natta catalysts is also known in principle, but the activity of the catalysts is generally reduced to a considerable extent.

Examples of processes for the copolymerisation of α-olefins with ethylenically unsaturated monomers containing polar groups can be found in J. Polym. Sci., Part A-1, 9, 471 to 483 (1971), in German Offenlegungsschrift No. 1,947,109 and also in British Pat. No. 1,505,480.

Thus, propylene/acrylic acid copolymers can be obtained by copolymerising propylene and the compound

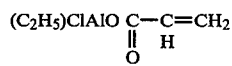

in the presence of a catalyst comprising TiCl$_3$/diethyl aluminium chloride. Copolymers obtained in this way are 54% soluble in boiling concentrated hydrochloric acid and can only be produced in a specific yield of from about 30 to 50 g of polymer per g of Ti.h.atm.

The process described in German Offenlegungsschrift No. 1,947,109 gives copolymers of α-olefin units and units corresponding to the formula

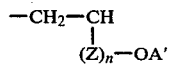

wherein Z represents a difunctional methylene group, n is $\geq 2$ and A' is a hydrogen atom or an acyl group. In this process, the polar comonomer is used in the form of a metal compound corresponding to the following formula

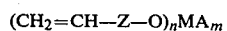

wherein Z represents a difunctional hydrocarbon group containing from 2 to 15 carbon atoms, A represents a halogen atom and/or a monofunctional hydrocarbon group, M represents a metal from Groups I to IV of the Periodic Table and n and m are integers so that the sum of n+m corresponds to the valency of the metal. The catalyst used is a halogen compound of titanium or vanadium whilst the co-catalyst is either the metal compound $(CH_2=C-Z-O)_n MA_m$, if it contains alkyl groups, or else aluminium or zinc alkyls are added.

The specific yields of copolymers as measured in g of polymer/g Ti.h.atm. (propylene) amount to between 10 and 70.

The process for synthesising copolymers described in British Patent No. 1,505,480 is a two-stage process which gives block-like copolymers having the following structure;

[poly-α-olefin]-[polyvinyl compound].

In a first stage, an α-olefin is polymerised in known manner using Ziegler-Natta catalysts. In a second stage, the vinyl compound, preferably an acrylate or a methacrylate, is added to the still active polyolefin ends in the simultaneous presence of phosphines and halogenated hydrocarbons as co-components.

By this method, it is possible with ethylene as the olefin component to obtain copolymers containing from 30 to 40% of methyl methacrylate for a homopolymer content of the methyl methacrylate of around 5%. With propylene as the olefin component, the copolymer contains approximately 0.5% by weight of methyl methacrylate, of which 2.6% by weight is in the form of homopolymer, for a specific yield of approximately 10 to 30 g of polymer/g T.h.atm.

DETAILED DESCRIPTION OF THE INVENTION

In contrast, the process according to the present invention enables allyl alcohol and ethylenically unsaturated comonomers containing acid groups to be used with increased yields.

Substituted α-olefins (B) containing polar groups preferably used in the process according to the invention are, for example, allyl alcohol, o-allyl phenol, 2,6-dimethyl-p-allyl phenol, eugenol.

The substituted α-olefins (B) may be converted into the aluminium compounds by reaction with an organo-aluminium compound, or example one corresponding to the following formula (C)

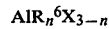    (C)

in which R is a $C_1-C_{18}$ alkyl group, X is a halogen atom, preferably a chlorine atom and n is an integer with $0<n\leq 3$.

Suitable aluminium compounds are, for example, triethyl aluminium, triisopropyl aluminium, tri-n-butyl aluminium and partially halogenated aluminium compounds, such as ethyl aluminium dichloride, diethyl aluminium chloride, diethyl aluminium bromide and, diethyl aluminium iodide. It is of particular advantage to use diethyl aluminium chloride.

The conversion into the aluminium compound may be carried out in an inert solvent by adding a solution of the α-olefins (B) dropwise with stirring at room temperature to a solution of the organo-aluminium compound in a molar ratio of 1:1. In this way, only one alkyl radical of the organo-aluminium compound is substituted and 1 mole of hydrocarbon is liberated. Suitable solvents are aliphatic and cycloaliphatic liquids containing from 5 to 18 C-atoms and also chlorinated hydrocarbons and aromatic hydrocarbons. Examples of suitable solvents are pentane, hexane, heptane, octane, decane, cyclohexane, methyl cyclohexane, benzene, toluene, xylene, ethyl benzene, benzyl chloride and dichloroethane. Iso-octane is particularly suitable.

The above-mentioned solvents are also suitable for use as suspension medium for the polymerisation of the metallates of the α-olefins (B) and α-olefins (A). Suitable α-olefins (A) are, for example, propylene, 1-butene, 1-pentene, 1-hexene, 1-undecene, 4-methyl-1-pentene and mixtures thereof.

Polymerisation may be carried out at temperatures in the range of from 20° to 100° C., preferably in the range of from 60° to 90° C., and under partial pressures of the monomers of from 1 to 30 bars. The solid catalytic complex based on $TiCl_3$ may be used in a concentration of from 0.1 to 500 m Mole/l and preferably in a concentration of from 1 to 50 m Mole/l. Co-catalysts are the aluminium organyls corresponding to formula (C). The molar ratio of aluminium organyl to $TiCl_3$- complex is generally from 1:1 to 100:1, preferably from 5:1 to 20:1 and, with particular advantage, from 8:1 to 12:1.

To carry out the polymerisation reaction, the catalyst and co-catalyst may with advantage be initially combined in about one tenth of the total solvent in a vessel preceding the reaction vessel. The suspension obtained is then added to the rest of the solvent containing the α-olefin (B) as metal compound. The molar ratio of α-olefin (B)-metallate to $TiCl_3$ complex is generally from 0.1 to 100 and more particularly from 20 to 80. If desired hydrogen may be added to regulate the molecular weight.

On completion of polymerisation, the catalyst may be deactivated with a mixture of alcohol and hydrochloric acid, so that poly-α-olefins containing alcohol groups, acid groups or phenol groups are obtained. The polymerisation mixture may also be advantageously deactivated with carboxylic acid anhydrides and carboxylic acid chlorides which results in the formation of poly-α-olefins containing ester groups. Suitable deactivators such as these are, for example, acetyl chloride, benzoyl chloride, chlorocarbonic acid phenyl ester and acetanhydride. Unsaturated carboxylic acid derivatives such as, for example, acrylic acid chloride and methacrylic acid chloride lead to poly-α-olefins containing double bonds which may be used, for example, as a graft base for further poly-reactions. Deactivation with bifunctional carboxylic acid derivatives leads to cross-linked poly-α-olefins.

A solid catalytic complex based on $TiCl_3$ ($TiCl_3$-complex in short) is used as catalyst constituent. This product corresponds to the following general formula:

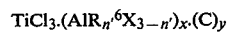

wherein
R is a $C_1-C_{18}$ alkyl radical;
X is a halogen atom (preferably chlorine);
n' is a whole number such that $O<n'<2$;
C is a complex-forming agent;
x is a number smaller than 0.3, and
y is a number larger than 0.001.

These complexes and the production thereof are described in German Offenlegungsschrift No. 2,213,086.

The copolymers of α-olefins according to this invention are thermoplastic moulding masses which may be processed into finished articles in the known manner. Due to their olefinic character, the copolymers possess the beneficial properties of known polymers such as resistance to water and chemical resistance to acids and alkalis. In addition to these properties, the copolymers of the present invention have improved dyeability and antistatic properties coupled with good adhesion and printability and much better miscibility with other polymers.

The present invention is illustrated by the following Examples:

Production of the catalytic TiCl$_3$-complex 60 ml of dried oxygen-free iso-octane and 15 ml of freshly distilled TiCl$_4$ (0.136 mole) were introduced into a 250-ml-flask. 31.5 ml of ethyl aluminium sesquichloride (0.139 mole) in 80 ml of iso-octane were then added dropwise over a period of 1 hour with slow stirring at a temperature of 0° C. On completion of the addition, the mixture was stirred for another hour at 0° C., after which time red-brown reaction product was filtered off at 0° C. and washed three times with 100 ml of precooled iso-octane at 0° C. The reduced solid was suspended in 100 ml of iso-octane and the resulting suspension was heated with stirring to 65° C., followed by stirring for 1 hour at 65° C. After cooling to room temperature, the product was washed once again with 100 ml of iso-ocatne and then suspended in 170 ml of iso-octane, 25 ml (0.123 mole) of diisoamyl ether was then added, followed by stirring for 1 hour at room temperature and for 1 hour at 35° C. The treated solid was washed three times with 100 ml of iso-octane and then suspended in 100 ml of iso-octane. 60 ml of TiCl$_4$ was added to the suspension, followed by heating to 65° C. and stirring for 4 hours at that temperature.

On completion of the reaction, the catalytic complex was washed 5 times with 100 ml of iso-octane and then suspended in 150 ml of iso-octane. The TiCl$_4$-concentration of the suspension was determined by titration against cerium(IV)-sulphate.

Polymerisation of propylene in iso-octane

A 2-liter glass autoclave was repeatedly evacuated and filled with argon. 800 ml of iso-octane was then introduced, after which a suspension of 250 mg of the above-described catalyst component and 2.01 ml of diethyl aluminium chloride (Al/Ti 10:1) in 200 ml of iso-octane was pumped in through a membrane pump. Polymerisation was carried out for 1 hour at 70° C. under a propylene partial pressure of 4 bars. The pressure was kept constant by the continuous introduction of propylene. On completion of the reaction, excess propylene was blown off and the polymer suspension was treated with an excess of a methanol-butanol mixture. After the polymer had been filtered off and dried in vacuo at 100° C, 208 g of polypropylene of which 96.4% was insoluble in boiling n-heptane was obtained. This corresponds to a specific yield of 208 g of PP/g TiCl$_3$.h.atm.

EXAMPLE 1

15.4 ml ($\approx$0.225 mole) of allyl alcohol in 300 ml of iso-octane is added dropwise with stirring at room temperature to a solution of 28.0 ml ($\approx$0.225 mole) of diethyl aluminium chloride in 300 ml of iso-octane, followed by reaction for 1 hour at 70° C. The solution is then transferred to a reaction autoclave. In a reaction vessel preceding the autoclave, 0.25 g ($\approx$0.6 m Mole) of TiCl$_3$-complex are contacted with 20 ml of a 10% solution of diethyl aluminium chloride in 50 ml of iso-octane and the suspension thus obtained is pumped into the reaction autoclave. After the polymerisation temperature of 70° C. has been reached, polymerisation is carried out for 1 hour under a propylene partial pressure of 4 bars, the pressure being kept constant by continuous inroduction of propylene. On completion of polymerisation, a unreacted propylene is blown off and the polymer suspension is treated with an excess of a mixture of methanol, n-butanol and hydrochloric acid. 100 g of copolymer having a comonomer content of 4% by weight and an isotactic fraction of 98% are obtained. This corresponds to a specific yield of 320 g of PP-copolymer/g Ti.h.atm. The product has a melt flow index (MSI 230/5) of 10 g/10 minutes and a copmonomer content of 9% by weight.

EXAMPLE 2

61.6 ml ($\approx$0.4 mole) of eugenol in 400 ml of iso-octane are added dropwise with stirring at room temperature to a solution of 49.7 ml ($\approx$0.40 mole) of diethyl aluminium chloride in 400 ml of iso-octane, followed by reaction for 1 hour at 70° C. After the solution has been transferred to the reaction autoclave, 0.25 g ($\approx$1.6 m Mole) of modified TiCl$_3$ are contacted in a reaction vessel preceding the autoclave with 20 ml of a 10% solution of diethyl aluminium chloride in 50 ml of iso-octane and the suspension obtained is pumped into the reaction autoclave. After the polymerisation temperature of 70° C. has been reached, polymerisation is carried out for 1 hour under a propylene partial pressure of 4 bars, the pressure being kept constant by the continuous introduction of propylene. On completion of polymerisation, unreacted propylene is blown off and the polymer suspension is treated with an excess of a mixture of methanol, n-butanol and hydrochloric acid. 132 g of a copolymer having a comonomer content of 38% by weight and an isotactic fraction of 93% are obtained. This corresponds to a specific yield of 426 g of PP-copolymer/g Ti.h.atm. The product has a melt flow index of 12 g/10 mins. (MSI 230/5) and a comonomer content of 10% by weight.

EXAMPLE 3

30.0 g ($\approx$0.163 mole) of 10-undec-1-enoic acid in 400 ml of iso-octane are added dropwise with stirring at room temperature to a solution of 20.3 ml ($\approx$0.163 mole) of diethyl aluminium chloride in 400 ml of iso-octane, followed by reaction for 1 hour at 70° C. After the solution has been transferred to the reaction autoclave, 0.25 g ($\approx$1.6 mMole) of modified TiCl$_3$ are contacted in a reaction vessel preceding the autoclave with 20 ml of a 10% solution of diethyl aluminium chloride in 50 ml of iso-octane and the suspension thus obtained is pumped into the reaction autoclave. After the polymerisation temperature of 70° C. has been reached, polymerisation is carried out for 1 hour under a propylene pressure of 4 bars, the pressure being kept constant by the continuous introduction of propylene. On completion of polymerisation, unreacted propylene is blown off and the polymer suspension is treated with an excess of a mixture of methanol, n-butanol and hydrochloric acid. 200 g of copolymer having a comonomer content of 8.5% by weight and an isotactic content of 94.5% is obtained. This corresponds to a specific yield of 666 g of PP-copolymer/g Ti.h.atm. The product has a melt flow index (230/5) of 6 g/10 mins. and a comonomer content of 4% by weight.

We claim:
1. Copolymers of alpha-olefins having a melt flow index of from 2 to 20 g/10 minutes, said alpha-olefins being propylene and 1 to 50% by weight of allyl alcohol incorporated by polymerization.

* * * * *